(12) United States Patent  
Maxfield et al.

(10) Patent No.: US 8,645,872 B2
(45) Date of Patent: Feb. 4, 2014

(54) USER INTERFACES FOR FACILITATING MERGING AND SPLITTING OF COMMUNICATION SESSIONS

(75) Inventors: Nathan J. Maxfield, Wakefield, MA (US); Heath Stallings, Colleyville, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 377 days.

(21) Appl. No.: 12/956,713

(22) Filed: Nov. 30, 2010

(65) Prior Publication Data

US 2012/0137231 A1     May 31, 2012

(51) Int. Cl.
 *G06F 3/033*     (2013.01)
 *G06F 3/00*      (2006.01)
(52) U.S. Cl.
 USPC ........................................ 715/863; 715/753
(58) Field of Classification Search
 USPC ........................................................ 715/753
 See application file for complete search history.

(56) References Cited

U.S. PATENT DOCUMENTS

| | | | |
|---|---|---|---|
| 2003/0182630 A1* | 9/2003 | Saund et al. | 715/530 |
| 2006/0245574 A1* | 11/2006 | Phelps et al. | 379/229 |
| 2007/0152984 A1* | 7/2007 | Ording et al. | 345/173 |
| 2008/0168361 A1* | 7/2008 | Forstall et al. | 715/753 |
| 2010/0083111 A1* | 4/2010 | de los Reyes | 715/702 |
| 2010/0203908 A1* | 8/2010 | Jeong et al. | 455/466 |
| 2010/0283743 A1* | 11/2010 | Coddington | 345/173 |
| 2011/0022982 A1* | 1/2011 | Takaoka et al. | 715/810 |
| 2011/0281652 A1* | 11/2011 | Laverdiere | 463/37 |

* cited by examiner

*Primary Examiner* — Doon Chow
*Assistant Examiner* — Conrad Pack

(57) ABSTRACT

An exemplary method includes a communication device maintaining multiple active communication sessions with multiple other communication devices, displaying, on a touch screen display, multiple graphical objects representing the multiple active communication sessions, detecting a pinch touch gesture provided by a user on the touch screen display in relation to the graphical objects representing the multiple active communication sessions, and initiating, in response to the pinch touch gesture, a merging of the multiple active communication sessions to form a merged active communication session. Corresponding methods and systems are also disclosed.

12 Claims, 10 Drawing Sheets

USER INTERFACES FOR FACILITATING MERGING AND SPLITTING OF COMMUNICATION SESSIONS

BACKGROUND INFORMATION

Advances in communications technologies have interconnected people perhaps better than ever. To illustrate, increased capabilities of communication devices, such as desktop phones, mobile phones, and other communication devices, and communication services accessible by such communication devices have allowed users to communicate like never before.

Such advances in communications technologies have challenged designers of user interfaces for communication devices. For example, a common challenge has been to design and implement user interfaces that provide an appropriate balance of information, usability, intuitiveness, control, and functionality that promotes a quality user experience. While user interface technologies have made significant advances in this regard, there remains room for improvement. For instance, there remains room to improve the intuitiveness and/or usability of user interfaces that are designed to be used by a user of a communication device to control or otherwise manage communication functions of the communication device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary user interfaces for facilitating merging and/or splitting of communication sessions are described herein. An exemplary user interface may be provided for use by a user to intuitively and/or conveniently provide one or more predefined touch gestures on a touch screen display to facilitate merging and/or splitting of communication sessions. In certain examples, a predefined touch gesture may include a pinch touch gesture or a reverse-pinch touch gesture provided by a user on a touch screen display in relation to one or more graphical objects that are displayed on the touch screen display and that represent one or more communication sessions. In response to a pinch gesture, multiple communication sessions may be merged to form a merged communication session. In response to a reverse-pinch gesture, a communication session may be split into multiple communication sessions. Exemplary systems, methods, and devices associated with user interfaces for facilitating merging and/or splitting of communication sessions will now be described in reference to the drawings.

Figure 1:
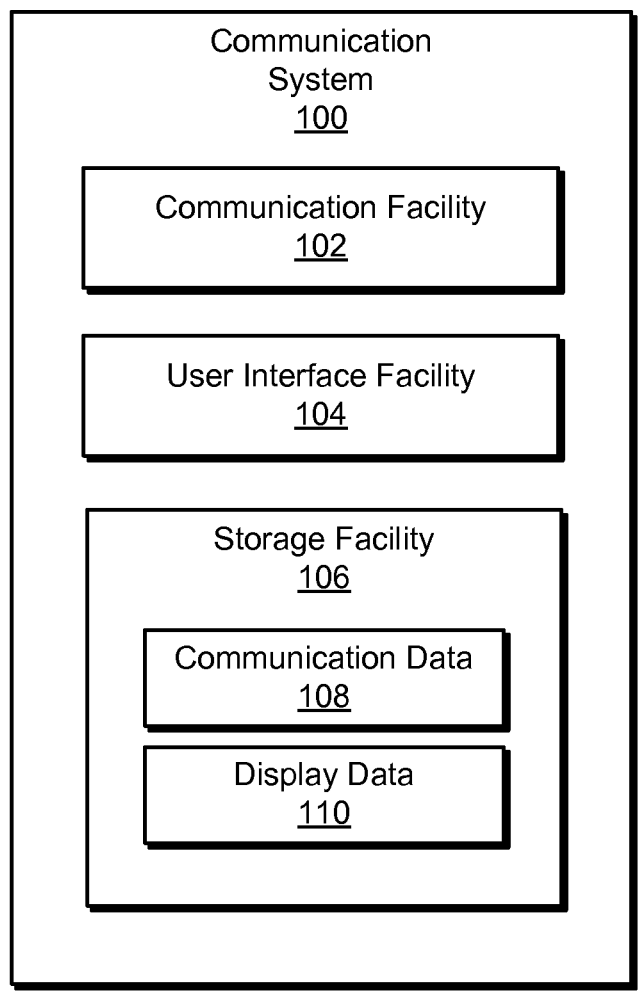
FIG. 1 illustrates an exemplary communication system according to principles described herein.

FIG. 1 illustrates an exemplary communication system 100 (or simply "system 100"). As shown, system 100 may include, without limitation, a communication facility 102, a user interface facility 104, and a storage facility 106 selectively and communicatively coupled to one another. Any suitable communication technologies, including any of the communication technologies mentioned herein, may be employed to facilitate communications between facilities 102-106. Each of these facilities will now be described in more detail.

Communication facility 102 may be configured to transmit and/or receive communication signals to/from one or more communication devices. The communication signals may be in any form suitable for communicating with one or more communication devices. Communication facility 102 may include and/or employ any technologies suitable for transmitting and/or receiving communication signals associated with any type and/or form of inter-device communications.

Communication facility 102 may be configured to maintain one or more communication sessions between communication devices. For example, communication facility 102 may be implemented by a communication device and may perform one or more operations to maintain one or more communication sessions with one or more other communication devices. Maintenance of a communication session may include performing any operation or set of operations associated with establishing the communication session, maintaining data related to the communication session (e.g., maintaining session setup, verification, authentication, and/or path information), maintaining communication paths related to the communication session, and transmitting and/or receiving communication signals during the communication session.

As used herein, the term "communication session" may refer to any session during which communication signals may be exchanged between two or more communication devices. An "active" communication session may refer to any communication session that has been established between two or more communication devices and that remains available for use by the communication devices to exchange communication signals. An established, active, communication session has not been terminated and/or does not need to be re-established to support exchange of communication signals. Examples of an active communication session include, without limitation, an active voice call session (e.g., a circuit-switched, packet-switched, or hybrid circuit and packet-switched voice call), an active video voice call session (e.g., a video conference call session), an active instant messaging session (e.g., a chat session), an active video instant messaging session (e.g., a video chat session), an active voice instant messaging session (e.g., a voice chat session), and any combination or sub-combination thereof.

A communication session may be a "separate" communication session between two communication devices or a "merged" communication session between more than two communication devices. During a separate communication session, two communication devices may exchange communication signals by way of a communication path, without the signals being shared with another communication device not included in the communication path. During a merged communication session, more than two communication devices may exchange communication signals. For example, two communication devices may exchange communication signals by way of a communication path, and the communication signals may be shared with at least one other communication device not included in the communication path. To illustrate, a communication device that maintains a separate communication session with another communication device may send and receive communication signals to/from the other communication device during the session, while a communication device that maintains a merged communication session with multiple other communication devices may send and receive communication signals to/from the other communication devices during the session. For example, a separate voice call session established between two communication devices may enable voice data and/or signals to be exchanged between the two communication devices, while a merged voice call session between more than two communication devices (e.g., a conference call session) may enable voice data and/or signals to be exchanged among more than two communication devices. Similarly, a separate instant messaging session established between two communication devices may enable instant messaging data to be exchanged between the two communication devices, while a merged instant messaging session between more than two communication devices (e.g., a conference chat session) may enable instant messaging data to be exchanged between more than two communication devices. Examples of separate and merged communication sessions are described further below.

Communication facility 102 may be configured to merge multiple communication sessions into a merged communication session and/or split a communication session into multiple communication sessions. The merging and/or splitting may be performed in any suitable way. For example, multiple communication sessions may be bridged together to form a merged communication session. Similarly, a communication session may be un-bridged to form multiple separate communication sessions. As another example, multiple communication sessions may be merged by modifying session endpoint information and/or routing instructions such that communication signals associated with a communication session between two communication devices may be shared with one or more additional communication devices. Similarly, a communication session may be split by modifying session endpoint information and/or routing instructions such that communication signals associated with the communication session will no longer be shared one or more communication devices. These examples are illustrative only. Communication sessions may be merged and/or split in any suitable way.

User interface facility 104 may be configured to perform one or more of the user interface operations described herein, including providing output to and/or receiving input from a user. For example, user interface facility 104 may be configured to provide output by generating and providing one or more graphical user interfaces ("GUIs") for display, including any of the exemplary GUIs described herein. Generation and display of a GUI may include rendering one or more graphical objects included in the GUI. In certain embodiments, a GUI including one or more graphical objects representing one or more communication sessions may be displayed on a touch screen display. Examples of such GUIs are described further below.

User interface facility 104 may be further configured to receive user input by way of a touch screen display. For example, one or more predefined touch gestures may be detected by way of a touch screen display and used to trigger merging and/or splitting of communication sessions by communication facility 102. A predefined touch gesture may include any gesture that may be provided by a user and detected by way of a touch screen display. Examples of predefined touch gestures are described further below.

User interface facility 104 may be configured to initiate a merging and/or a splitting of communication sessions in response to a detected predefined touch gesture. For example, user interface facility 104 may initiate a merge and/or a split by sending a request for a merge and/or split to communication facility 102 and/or to any device equipped to perform one or more merge and/or split operations. Communication facility 102 may respond to such a request by merging or splitting communication sessions. In certain examples, communication facility 102 may merge or split communication sessions by sending a request for a merge or a split of communication sessions to one or more communication devices capable of merging or splitting communication sessions. For instance, communication facility 102 may send a request to a voice call bridge device (e.g., a PBX device, NBX device, bridge server, or other device capable of bridging and/or un-bridging voice calls) equipped to merge voice call sessions into a conference call session and/or to split a conference call session into multiple separate voice call sessions.

Storage facility 106 may be configured to store communication data 108 representative of one or more communication sessions maintained by communication facility 102 and user interface data 110 representative of a GUI displayed and/or user input received by user interface facility 104. It will be recognized that storage facility 106 may maintain additional or alternative data as may serve a particular application.

Figure 2:
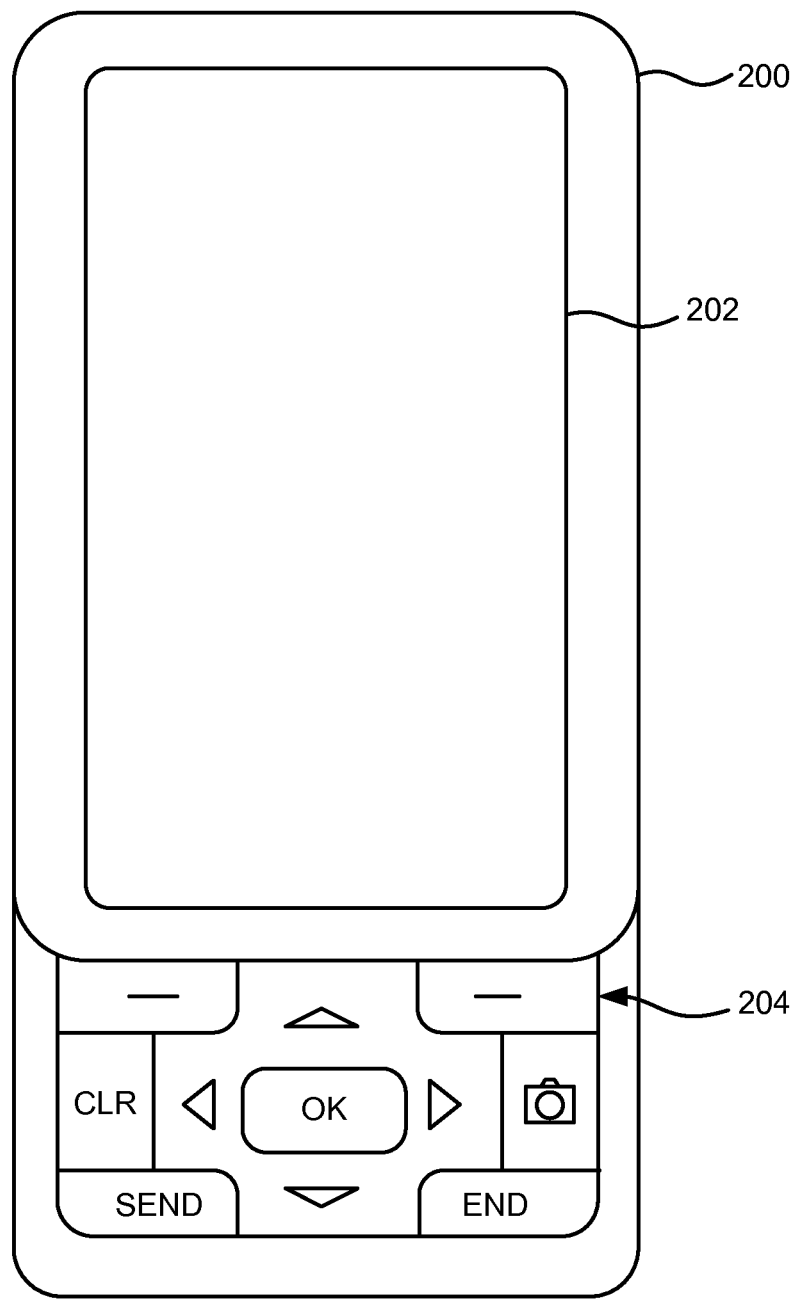
FIG. 2 illustrates an exemplary communication device implementing the system of FIG. 1 according to principles described herein.

System 100 may be implemented by one or more communication devices and/or in any other suitable manner. For example, FIG. 2 illustrates an exemplary communication device 200 (or simply "device 200") having system 100 implemented thereon. Device 200 may include one or more of the facilities 102-106 shown in FIG. 1 and may be configured to perform one or more of the processes and/or operations described herein. Device 200 may include, but is not limited to, a mobile device (e.g., a mobile phone device, smart phone device, tablet computer, laptop computer, etc.), media device, computer, gaming device, phone device (e.g., Verizon Hub device), personal-digital assistant, communication bridge device (e.g., a voice call bridge device), and/or any other communication device capable of maintaining communication sessions with other communication devices and of detecting touch gesture input provided by a user.

As shown in FIG. 2, device 200 may include a touch screen display 202 configured to display one or more GUIs for viewing by a user of device 200 and to detect user input provided by a user by way of the touch screen display. Touch screen display 202 may be included in or otherwise interfaced with user interface facility 104 and may include single-touch and/or multi-touch touch screen technologies. Examples of GUIs that may be displayed on touch screen display 202 are described in detail further below. In addition to touch screen display 202, device 200 may include other input mechanisms such as one or more of the input buttons 204 shown in FIG. 2.

Figure 3A:
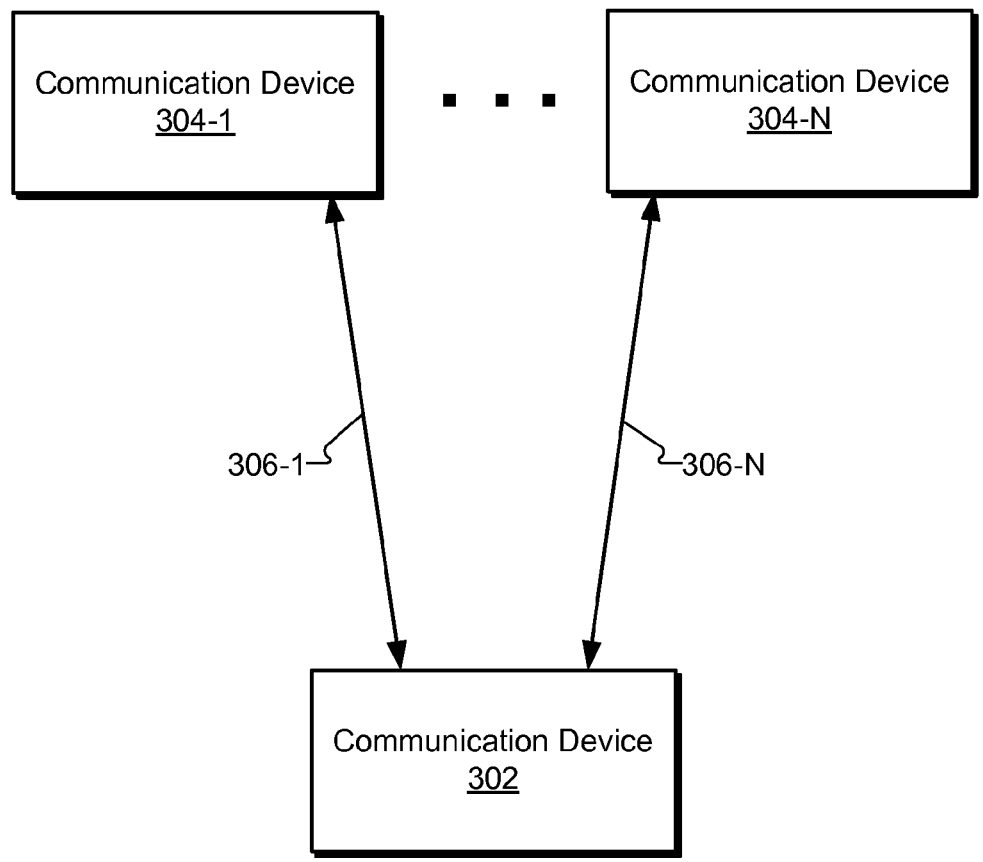
FIG. 3A illustrates a communication device in communication with multiple other communication devices by way of multiple separate communication sessions according to principles described herein.
Figure 3B:
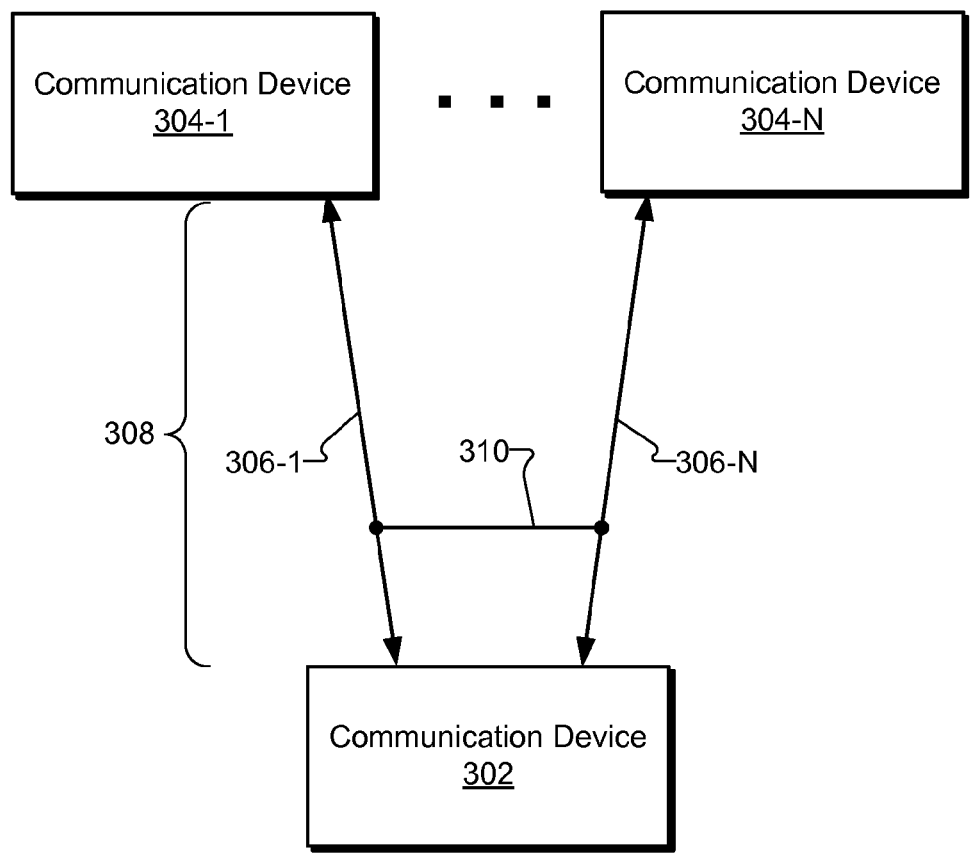
FIG. 3B illustrates a communication device in communication with multiple other communication devices by way of a merged communication session according to principles described herein.

FIGS. 3A-3B illustrate a communication device 302, which may implement system 100, in communication with multiple other communication devices 304 (e.g., communication devices 304-1 through 304-N). Communication device 302 and communication devices 304 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications technologies.

In certain embodiments, communication device 302 and communication devices 304 may communicate via one or more networks, which may include, but are not limited to, one or more wireless networks (Wi-Fi networks), wireless communication networks, mobile telephone networks (e.g., cellular telephone networks), closed media networks, open media networks, closed communication networks, open communication networks, satellite networks, navigation networks, broadband networks, narrowband networks, voice communication networks (e.g., PSTN and/or VoIP networks), the Internet, local area networks, and any other networks capable of carrying data and/or communications signals between communication device 302 and communication devices 304. Communications between communication device 302 and communication devices 304 may be transported using any one of the above-listed networks, or any combination or sub-combination of the above-listed networks. Alternatively, communication device 302 and communication devices 304 may communicate in another way such as by one or more direct connections between communication device 302 and communication devices 304.

In the example shown in FIG. 3A, communication device 302 maintains a separate communication session with each of the other communication devices 304. For example, communication device 302 may maintain a first communication session 306-1 with communication device 304-1 and another communication session 306-N with communication device 304-N. Accordingly, communication session 306-1 may support communications between communication device 302 and communication device 304-1, and communication session 306-N may support communications between communication device 302 and communication device 304-N. Communication sessions 306-1 and 306-N may be separate and independent such that communications are not shared across communication sessions 306-1 and 306-N.

In certain examples, communication session 306-1 may comprise a first active voice call session established between communication device 302 and communication device 304-1, and communication session 306-N may comprise another active voice call session established between communication device 302 and communication device 304-N. In other examples, communication session 306-1 may comprise a first active instant messaging session established between communication device 302 and communication device 304-1, and communication session 306-N may comprise another active instant messaging session established between communication device 302 and communication device 304-N. These examples are illustrative only. Communication sessions 306 may include other types and/or forms of communication sessions in other examples.

In the example shown in FIG. 3B, communication device 302 maintains a single merged communication session 308 with multiple other communication devices 304. Merged communication session 308 may be formed and/or maintained in any suitable way, including any of the ways described herein.

As an example, multiple communication sessions 306 maintained by communication device 302 with multiple communication devices 304 may be bridged to form merged communication session 308. Communication sessions 306 may be bridged in any way suitable for merging communication sessions 306 such that communications sent or received by way of one of the communication sessions 306 are bridged onto one or more other bridged communication sessions 306. FIG. 3B shows a bridge 310 established between communication sessions 306-1 and 306-N. Accordingly, communications sent or received by way of communication session 306-1 will be bridged onto communication session 306-N and vice versa. Bridge 310, which may include a physical and/or a logical connection between communication paths and/or sessions 306, may be established at any suitable point along communications paths between communication device 302 and communication devices 304-1 and 304-N. For example, bridge 310 may be established within communication device 302 and/or at one or more other devices (e.g., at a bridge server, PBX device, NBX device, router, gateway, etc.).

Figure 4:
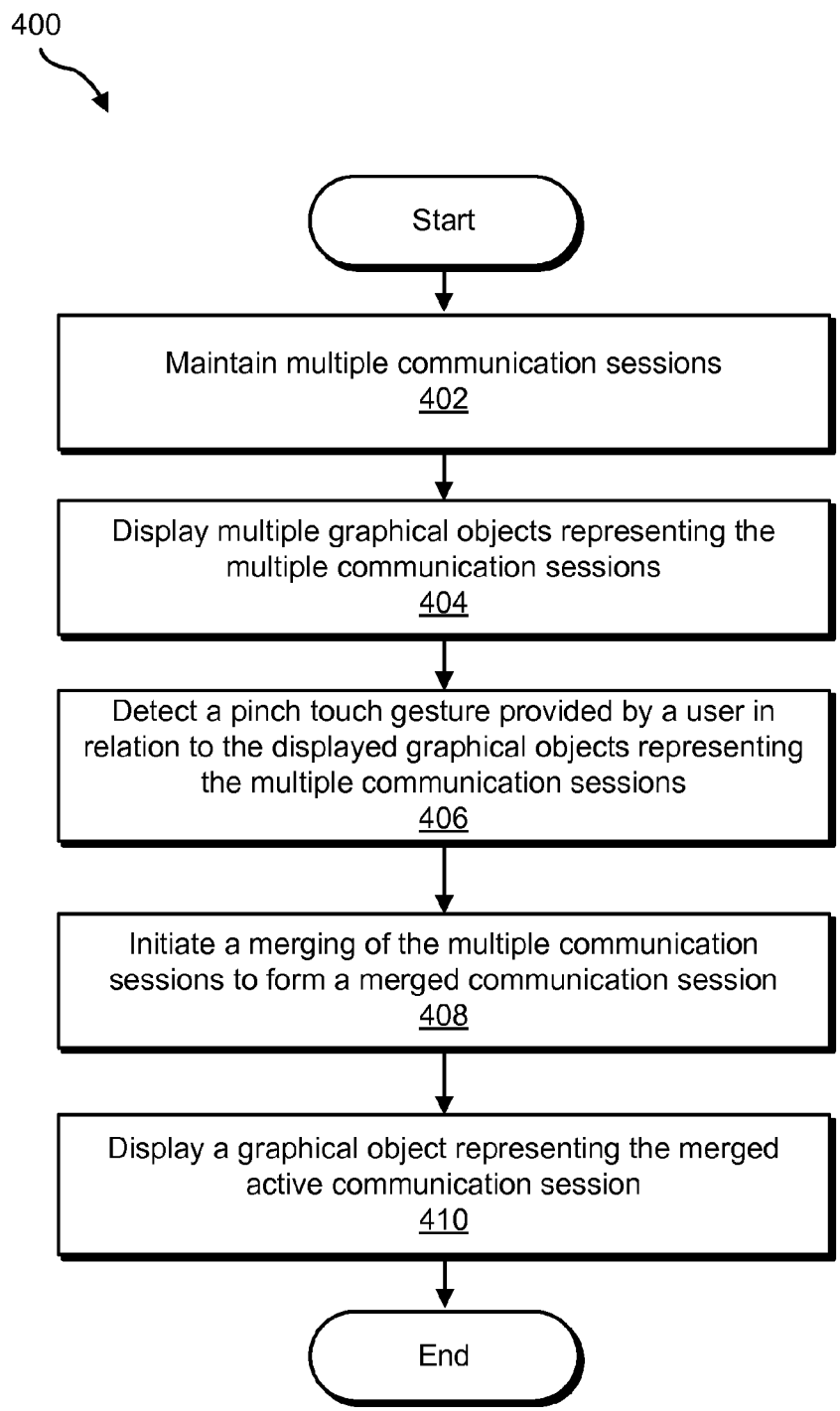
FIG. 4 illustrates an exemplary method of a user interface facilitating a merging of communication sessions according to principles described herein.

FIG. 4 illustrates an exemplary method 400 of a user interface facilitating a merging of communication sessions according to principles described herein. While FIG. 4 illustrates exemplary steps according to one embodiment, other embodiments may omit, add to, reorder, combine, and/or modify any of the steps shown in FIG. 4. The steps shown in FIG. 4 may be performed by any component or combination of components of system 100 and/or one or more devices implementing system 100.

In step 402, multiple communication sessions may be maintained. For example, a communication device may maintain multiple communication sessions with multiple other communication devices, as described herein.

In step 404, multiple graphical objects representing the multiple communication sessions may be displayed. For example, the communication device may display the multiple graphical objects representing the multiple communication sessions on a touch screen display, as described herein.

In step 406, a pinch touch gesture provided by a user in relation to the displayed graphical objects representing the multiple communication sessions may be detected. For example, the communication device may detect a pinch touch gesture provided by a user in relation to the displayed graphical objects representing the multiple communication sessions, as described herein.

In step 408, a merging of the multiple communication sessions to form a merged communication session may be initiated. For example, the communication device may initiate, in response to the pinch touch gesture detected in step 406, a merging of the multiple communication sessions to form a merged communication session. The merging may be performed in any suitable way, including in any of the ways described herein.

In step 410, a graphical object representing the merged communication session may be displayed. For example, the communication device may display, on the touch screen display, a graphical object representing the merged active communication session.

Figure 5A:
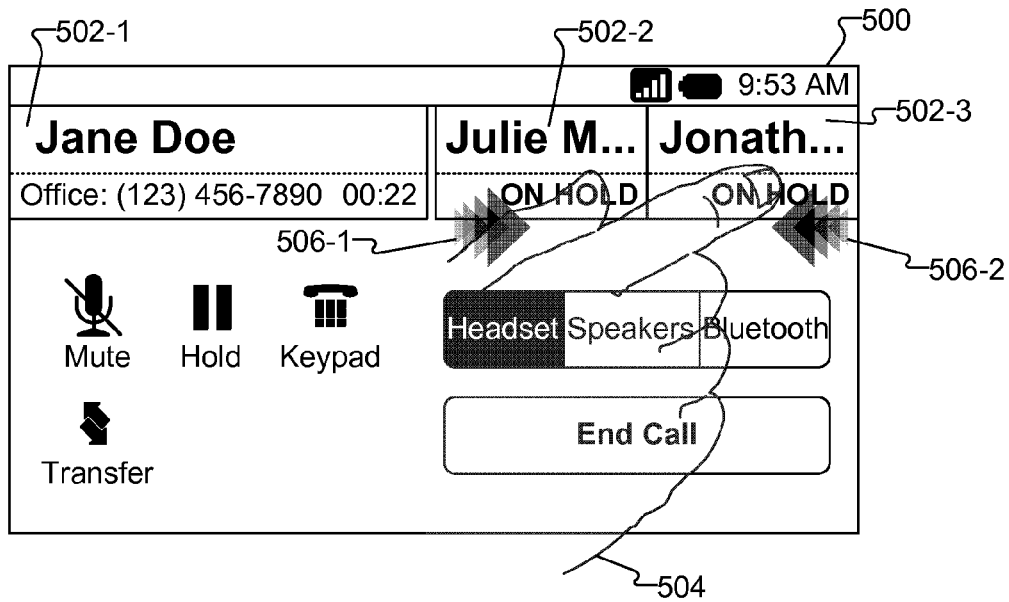
FIGS. 5A-5B illustrate exemplary graphical user interface views associated with a merging of communication sessions into a merged communication session according to principles described herein.
Figure 5B:
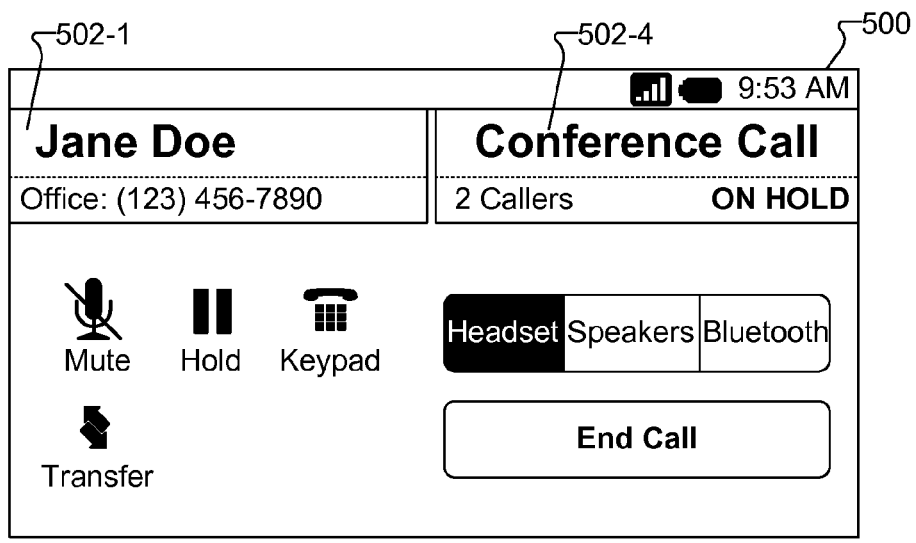

FIGS. 5A-5B illustrate exemplary graphical user interface views associated with a merging of multiple communication sessions into a merged communication session. FIG. 5A shows a graphical user interface 500 ("GUI 500") that may be displayed on a display for viewing by a user. As shown, GUI 500 may include multiple graphical objects 502 (e.g., graphical objects 502-1 through 502-3) representing multiple active communication sessions displayed therein. In the example shown in FIG. 5A, the active communication sessions represented by graphical objects 502 comprise active voice calls established with multiple communication devices associated with multiple users. For example, graphical object 502-1 represents a first active voice call with a first communication device associated with a first user named "Jane Doe." Graphical object 502-1 includes information indicating the name of the user, a telephone number associated with the user, and the duration of the active voice call with the user. Graphical object 502-2 represents a second active voice call with a second communication device associated with a second user named "Julie M." Graphical object 502-2 includes information indicating the name of the user and that the active voice call is on hold. Graphical object 502-3 represents a third active voice call with a third communication device associated with a third user named "Jonathan." Graphical object 502-3 includes information indicating the name of the user and that the active voice call is on hold.

A user may interact with GUI 500 by providing one or more predefined touch gestures on a touch screen display on which GUI 500 is displayed. For example, a user may touch one or more graphical objects included in GUI 500 to mute a voice call, place a voice call on hold, remove a voice call from hold, transfer a voice call to another destination, end a voice call, display a keypad, and activate or deactivate a headset, speakers, or Bluetooth connection.

The user may additionally or alternatively be able to interact with GUI 500 by providing a predefined touch gesture in relation to graphical objects 502 to trigger a merging of multiple voice calls represented by graphical objects 502 to form a conference call session. To illustrate, FIG. 5A shows a user hand 504 positioned such that the thumb and a finger of user hand 504 are touching graphical objects 502-2 and 502-3, respectively, on the touch screen display on which GUI 500 is displayed. After the user has initiated contact between the thumb and graphical object 502-2 and between the finger and graphical object 502-3 on the touch screen display, the user may slide the thumb and finger together on the touch screen display to perform a pinch touch gesture in relation to graphical objects 502-2 and 502-3 on the touch screen display. The sliding motion of the pinch touch gesture is represented by arrows 506 (e.g., arrows 506-1 and 506-2) in FIG. 5A.

As described above, system 100 may detect the pinch touch gesture provided by the user in relation to graphical objects 502-2 and 502-3 on touch screen display and respond by initiating a merge of the active voice calls represented by graphical objects 502-2 and 502-3. System 500 may update GUI 500 to reflect the merge. For example, FIG. 5B illustrates a view of GUI 500 after the active voice calls represented by graphical objects 502-2 and 502-3 in FIG. 5A are merged to form a conference call session. As shown in FIG. 5B, GUI 500 may include a graphical object 502-4 representing the conference call with "Julie M." and "Jonathan." In the illustrated example, graphical object 502-4 representing the conference call has replaced graphical objects 502-2 and 502-3 in GUI 500.

While the example illustrated in FIGS. 5A-5B shows a pinch touch gesture provided in relation to graphical objects (e.g., graphical objects 502-2 and 502-3) that are displayed adjacent to one another in GUI 500, this is illustrative only. In certain examples, system 100 may be configured to detect and respond to a pinch touch gesture that is provided in relation to non-adjacent graphical objects that have one or more other graphical objects representing communication sessions disposed between the non-adjacent graphical objects.

To illustrate, instead of a user providing a pinch touch gesture in relation to graphical objects 502-2 and 502-3 as shown in FIG. 5A, the user may provide a pinch touch gesture in relation to graphical objects 502-1 and 502-3 displayed in GUI 500. For example, the user may touch the thumb and finger of user hand 504 on graphical objects 502-1 and 502-3 and slide the thumb and finger together on the touch screen display. System 100 may detect the pinch touch gesture provided by the user in relation to graphical objects 502-1 and 502-3 and respond by merging communication sessions to form a merged communication session.

In certain examples, in response to the pinch touch gesture provided in relation to non-adjacent graphical objects (e.g., graphical objects 502-1 and 502-3), system 100 may be configured to merge only the active voice calls represented by non-adjacent graphical objects to form a conference call session (e.g., a conference call with "Jane Doe" and "Jonathan"). In other examples, in response to the pinch touch gesture provided in relation to non-adjacent graphical objects (e.g., graphical objects 502-1 and 502-3), system 100 may be configured to merge the active voice calls represented by the non-adjacent and any active voice calls represented by one or more other graphical objects disposed between the non-adjacent graphical objects (e.g., an active voice call represented by graphical object 502-2) to form a conference call session (e.g., a conference call with "Jane Doe," "Julie M.," and "Jonathan").

In certain embodiments, how system 100 merges communication sessions in response to a detection of a user pinch gesture that is provided in relation to non-adjacent graphical objects representing communication sessions may be user configurable. For example, user interface facility 104 may be configured to provide one or more user configuration GUI views in which a user may configure how system 100 is to merge communication sessions in response to a user pinch gesture that is provided in relation to non-adjacent graphical objects representing communication sessions. For instance, a user may select whether the merged communication session will include only the communication sessions represented by the non-adjacent graphical objects or the communication sessions represented by the non-adjacent graphical objects as well as any other communication sessions represented by one or more other graphical objects disposed between the non-adjacent graphical objects. Alternatively, the user may select to be prompted to provide input indicating how to merge communication sessions each time a user pinch gesture provided in relation to non-adjacent graphical objects representing communication sessions is detected.

In certain embodiments, user interface facility 104 may be configured to prompt a user for input indicating how to merge communication sessions in response to a detection of a user pinch gesture provided in relation to non-adjacent graphical objects representing communication sessions. The prompt may be provided in any suitable way, such as a display of a GUI or window (e.g., a pop-up window within GUI 500). In certain examples, the prompt may be configured to prompt the user to provide input indicating whether a merge of communication sessions is to be performed such that only the communication sessions represented by non-adjacent graphical objects are included in the merge, or whether the merge of communication sessions is to be performed such that the communication sessions represented by the non-adjacent graphical objects as well as any other communication sessions represented by one or more other graphical objects disposed between the non-adjacent graphical objects are included in the merge.

While FIGS. 5A-5B illustrate exemplary GUI views associated with a particular type of communication sessions (e.g., active voice call sessions), this is illustrative only. Similar GUI views associated with one or more other types of communication sessions (e.g., active chat and/or video conferencing sessions) may be provided in other examples.

Figure 6:
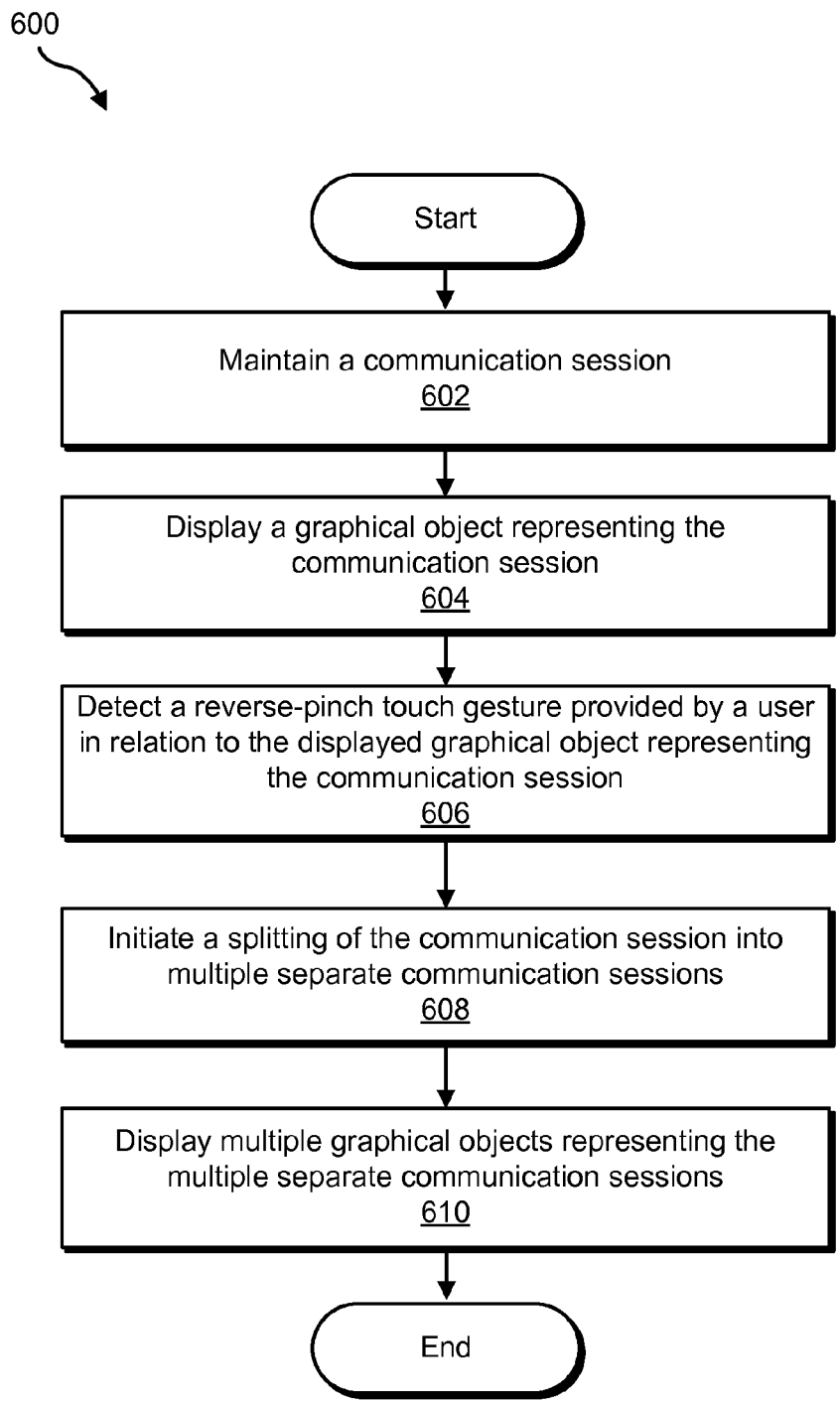
FIG. 6 illustrates an exemplary method of a user interface facilitating a splitting of a communication session according to principles described herein.

FIG. 6 illustrates an exemplary method 600 of a user interface facilitating a splitting of a communication session according to principles described herein. While FIG. 6 illustrates exemplary steps according to one embodiment, other embodiments may omit, add to, reorder, combine, and/or modify any of the steps shown in FIG. 6. One or more of the steps shown in FIG. 6 may be combined with and/or performed in conjunction with (e.g., performed before or after) one or more steps of method 400 shown in FIG. 4. The steps shown in FIG. 6 may be performed by any component or combination of components of system 100 and/or one or more devices implementing system 100.

In step 602, a communication session may be maintained. For example, a communication device may maintain a communication session with multiple other communication devices.

In step 604, a graphical object representing the communication session may be displayed. For example, the communication device may display the graphical object representing the communication session on a touch screen display, as described herein.

In step 606, a reverse-pinch touch gesture provided by a user in relation to the displayed graphical object representing the communication session may be detected. For example, the communication device may detect a reverse-pinch touch gesture provided by a user in relation to the displayed graphical object representing the communication session, as described herein.

In step 608, a splitting of the communication session into multiple separate communication sessions may be initiated. For example, the communication device may initiate, in response to the reverse-pinch touch gesture detected in step 606, a splitting of the communication session to form multiple separate communication sessions. The splitting may be performed in any suitable way, including in any of the ways described herein.

In step 610, multiple graphical objects representing the multiple separate communication sessions may be displayed. For example, the communication device may display, on the touch screen display, multiple graphical objects representing the multiple separate communication sessions.

Figure 7A:
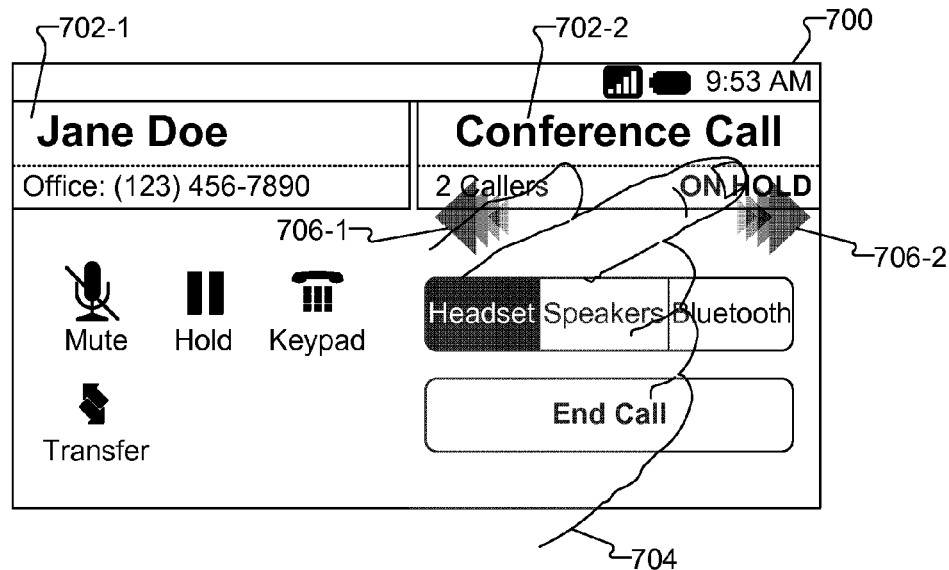
FIGS. 7A-7B illustrate exemplary graphical user interface views associated with a splitting of a communication session into multiple communication sessions according to principles described herein.
Figure 7B:
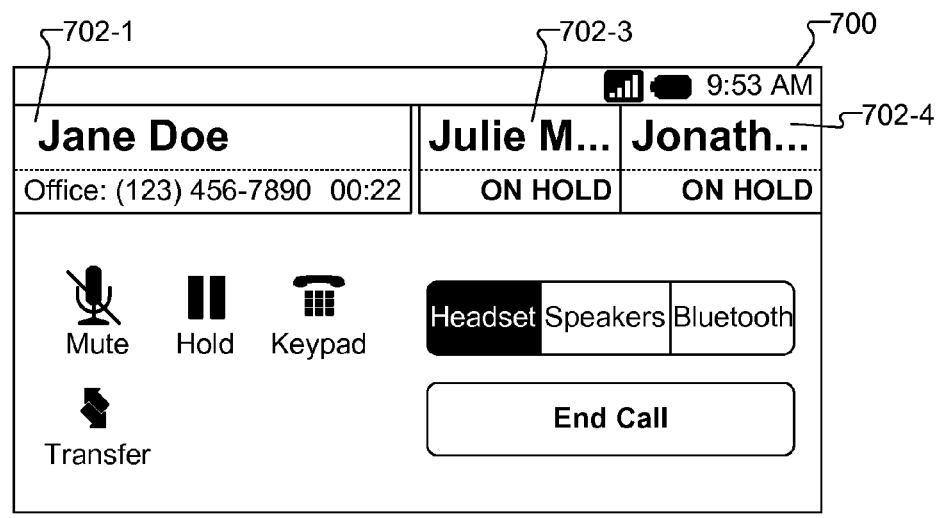

FIGS. 7A-7B illustrate exemplary graphical user interface views associated with a splitting of a communication session into multiple communication sessions according to principles described herein. FIG. 7A shows a graphical user interface 700 ("GUI 700") that may be displayed on a display for viewing by a user. As shown, GUI 700 may include multiple graphical objects 702 (e.g., graphical objects 702-1 and 702-2) representing multiple active communication sessions displayed therein. In the example shown in FIG. 7A, the active communication sessions represented by graphical objects 702 comprise active voice calls established with multiple communication devices associated with multiple users. For example, graphical object 702-1 represents a first active voice call with a first communication device associated with a first user named "Jane Doe." Graphical object 702-1 includes information indicating the name of the user and a telephone number associated with the user. Graphical object 702-2 represents a second active voice call, which is an active conference call with communication devices associated with two users. Graphical object 702-2 includes information indicating that the active voice call is a conference call, that the conference call is with two callers, and that the conference call is on hold.

A user may interact with GUI 700 by providing one or more predefined touch gestures on a touch screen display on which GUI 700 is displayed. For example, a user may touch one or more graphical objects included in GUI 700 to mute a voice call, place a voice call on hold, remove a voice call from hold, transfer a voice call to another destination, end a voice call, display a keypad, and activate or deactivate a headset, speakers, or Bluetooth connection.

The user may additionally or alternatively be able to interact with GUI 700 by providing a predefined touch gesture in relation to a graphical object (e.g., graphical object 702-2) to trigger a splitting of a communication session represented by the graphical object to form multiple separate communication sessions. To illustrate, FIG. 7A shows a user hand 704 positioned such that the thumb and a finger of user hand 704 are touching graphical object 702-2 on the touch screen display on which GUI 700 is displayed. After the user has initiated contact between the thumb and graphical object 702-2 and between the finger and graphical object 702-2 on the touch screen display, the user may slide the thumb and finger apart from one another on the touch screen display to perform a reverse-pinch touch gesture in relation to graphical object 702-2 on the touch screen display. The sliding motion of the reverse-pinch touch gesture is represented by arrows 706 (e.g., arrows 706-1 and 706-2) in FIG. 7A.

As described above, system 100 may detect the reverse-pinch touch gesture provided by the user in relation to graphical object 702-2 on touch screen display and respond by initiating a split of the active conference call represented by graphical object 702-2. System 700 may update GUI 700 to reflect the split. For example, FIG. 7B illustrates a view of GUI 700 after the active conference call represented by graphical object 702-2 in FIG. 7A is split to form multiple separate voice calls. As shown in FIG. 7B, GUI 700 may include graphical objects 702-3 and 702-4 representing multiple separate voice calls with communication devices associated with "Julie M." and "Jonathan." In the illustrated example, graphical objects 702-3 and 702-4 representing the multiple separate voice calls have replaced graphical object 702-2 in GUI 700.

While the example illustrated in FIGS. 7A-7B shows a split of an active conference call with two users into two separate active voice calls with communication devices associated with the users, this is illustrative only. In certain examples, an active conference call may be with more than two users, and system 100 may be configured to detect and respond to a reverse-pinch touch gesture that is provided by a user in relation to a graphical object that represents such a conference call.

To illustrate, instead of the conference call represented by graphical object 702-2 in FIG. 7A being with two users, the conference call represented by graphical object 702-2 may be with more than two users. A user may provide a reverse-pinch touch gesture in relation to graphical object 702-2 representing such a conference call as described above. System 100 may detect the reverse-pinch touch gesture provided by the user in relation to graphical object 702-2 and respond by spitting the conference call to form multiple separate communication sessions.

System 100 may split the conference call with more than two users in a number of different ways. In certain examples, in response to the reverse-pinch touch gesture provided in relation to a graphical object (e.g., graphical object 702-2) representing a conference call with more than two users, system 100 may be configured to automatically split the conference call into multiple separate voice calls with all of the users or into a separate voice call with one of the users (e.g., the user who last joined the conference call) and a conference call with the remaining users.

In certain embodiments, how system 100 splits the communication session in response to a detection of a user reverse-pinch gesture that is provided in relation to a graphical object representing a conference call with more than two users may be user configurable. For example, user interface facility 104 may be configured to provide one or more user configuration GUI views in which a user may configure how system 100 is to split a communication session in response to a user reverse-pinch gesture that is provided in relation to a graphical object representing a conference call with more than two users. For instance, a user may select whether the conference call will be split into multiple separate voice calls for all of the users or whether a single user will be split off from the conference call. Alternatively, the user may select to be prompted to provide input indicating how to split a conference call each time a user reverse-pinch gesture is provided in relation to a graphical object representing a conference call with more than two users is detected.

Figure 8:
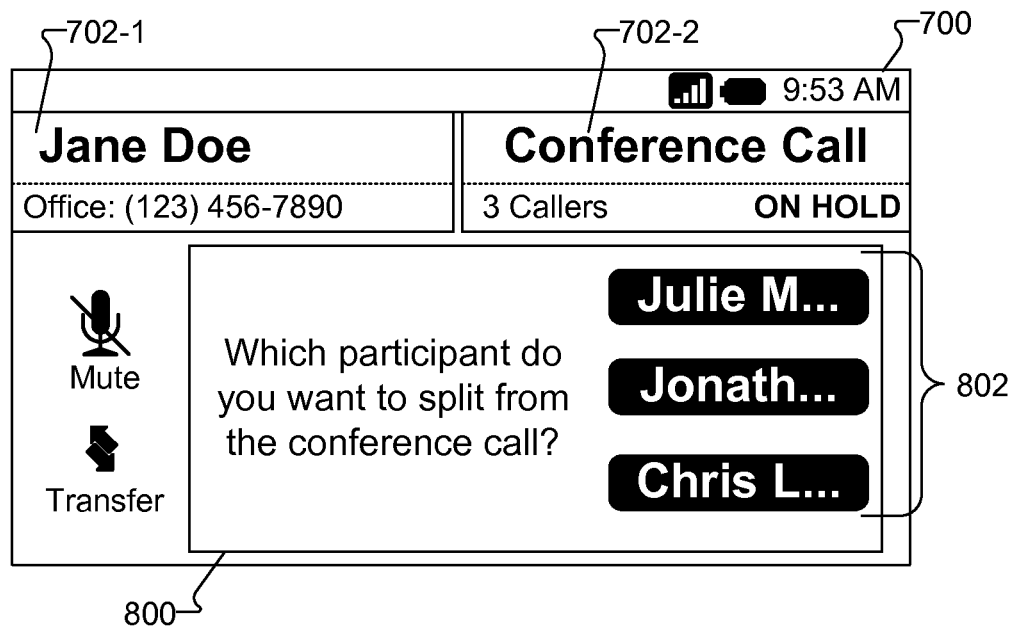
FIG. 8 illustrates an exemplary graphical user interface view prompting a user for input indicating how to split a communication session into multiple communication sessions according to principles described herein.

In certain embodiments, user interface facility 104 may be configured to prompt a user for input indicating how to split a conference call in response to a detection of a user reverse-pinch gesture provided in relation to a graphical object representing a conference call with more than two users. The prompt may be provided in any suitable way, such as a display of a GUI or window (e.g., a pop-up window within GUI 700). For example, FIG. 8 illustrates an exemplary graphical user interface view providing options that may be selected by a user to indicate how to split a conference call with three users. As shown in FIG. 8, a popup window 800 having a list of selectable options 802 may be displayed in GUI 700 and may prompt a user to select, from the list of options 802, which of the conference call participants is to be split off from the conference call. In response to a selection of an option associated with a participant, the conference call may be split into a separate voice call with the participant and a conference call with the remaining participants.

While FIGS. 7A-7B and FIG. 8 illustrate exemplary GUI views associated with a particular type of communication sessions (e.g., active voice call sessions), this is illustrative only. Similar GUI views associated with one or more other types of communication sessions (e.g., active chat and/or video conferencing sessions) may be provided in other examples.

In certain embodiments, one or more of the components and/or processes described herein may be implemented and/or performed by one or more appropriately configured computing devices (e.g., one or more communication devices). To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
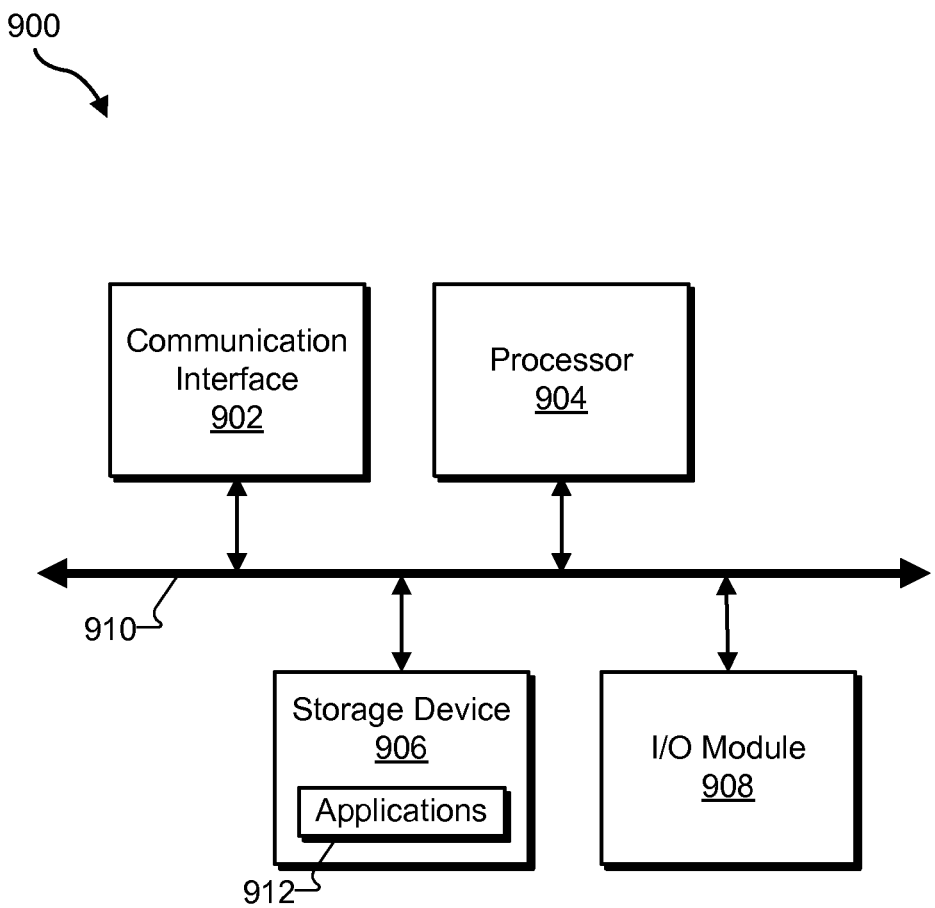
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a communications medium interface, a modem, and any other suitable interface. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with communication facility 102 and/or user interface facility 104. Likewise, storage facility 106 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a communication device, multiple active communication sessions with multiple other communication devices;
   displaying, by the communication device on a touch screen display, multiple graphical objects representing the multiple active communication sessions, the multiple graphical objects including
      non-adjacent graphical objects representing two or more of the multiple active communication sessions included in the multiple active communication sessions, and
      one or more other graphical objects representing one or more other active communication sessions included in the multiple active communication sessions, the one or more other graphical objects disposed between the non-adjacent graphical objects;
   detecting, by the communication device, a pinch touch gesture provided by a user on the touch screen display in relation to the non-adjacent graphical objects representing two or more of the multiple active communication sessions;
   prompting, by the communication device in response to the pinch touch gesture, the user to provide input indicating whether only the active communication sessions represented by the non-adjacent graphical objects are to be merged or whether the active communication sessions represented by the non-adjacent graphical objects as well as all of the other active communication sessions represented by the one or more other graphical objects disposed between the non-adjacent graphical objects are to be merged;
   receiving, by the communication device from the user, the input indicating which of the multiple active communication sessions are to be merged; and
   initiating, by the communication device in response to the receiving of the input, a merging of the multiple active communication sessions indicated by the input to form a merged active communication session.

2. The method of claim 1, further comprising displaying, by the communication device on the touch screen display, a graphical object representing the merged active communication session.

3. The method of claim 2, wherein the displaying of the graphical object representing the merged active communication session comprises replacing the multiple graphical objects representing the multiple active communication sessions with the graphical object representing the merged active communication session on the touch screen display.

4. The method of claim 2, further comprising:
   detecting, by the communication device, a reverse-pinch touch gesture provided by the user on the touch screen display in relation to the graphical object representing the merged active communication session; and
   initiating, by the communication device in response to the reverse-pinch touch gesture, a splitting of the merged active communication session into the multiple active communication sessions.

5. The method of claim 1, wherein:
   the multiple active communication sessions comprise multiple separate, active voice call sessions with the multiple other communication devices; and
   the merged active communication session comprises a conference call session with two or more of the multiple other communication devices.

6. The method of claim 5, wherein the merging of the two or more of the multiple active communication sessions to form the merged active communication session comprises bridging the multiple separate, active voice call sessions together to form the conference call session.

7. The method of claim 1, wherein the multiple active communication sessions comprise multiple instant messaging sessions, multiple text messaging sessions, multiple media messaging sessions, multiple video communication sessions, or multiple video instant messaging sessions.

8. The method of claim 1, wherein:
the maintaining of the multiple active communication sessions with the multiple other communication devices comprises maintaining a first active communication session with a first other communication device, a second active communication session with a second other communication device, and a third active communication session with a third other communication device;
the displaying of the multiple graphical objects representing the multiple active communication sessions comprises displaying a first graphical object representing the first active communication session, a second graphical object representing the second active communication session, and a third graphical object representing the third active communication session, wherein the first graphical object and the third graphical object are non-adjacent to one another with the second graphical object disposed between the first graphical object and the third graphical object;
the detecting of the pinch touch gesture provided by the user on the touch screen display in relation to the non-adjacent graphical objects comprises detecting the pinch touch gesture indicating a pinching together of the first graphical object and the third graphical object; and
the initiating of the merging of the multiple active communication sessions to form the merged active communication session comprises initiating a merging of the first active communication session and the third active communication session to form the merged active communication session.

9. The method of claim 1, embodied as computer-executable instructions on at least one non-transitory computer-readable medium.

10. A method comprising:
maintaining, by a communication device, a first active communication session with a first other communication device;
displaying, by the communication device on a touch screen display, a first graphical object representing the first active communication session;
maintaining, by the communication device, a second active communication session with a second other communication device;
displaying, by the communication device together with the first graphical object on the touch screen display, a second graphical object representing the second active communication session;
maintaining, by the communication device, a third active communication session with a third other communication device;
displaying, by the communication device together with the first graphical object and the second graphical object on the touch screen display, a third graphical object representing the third active communication session, the second graphical object disposed between the first graphical object and the third graphical object;
detecting, by the communication device, a pinch touch gesture provided by a user on the touch screen display in relation to the first graphical object representing the first active communication session and the third graphical object representing the third active communication session;
prompting, by the communication device in response to the pinch touch gesture, the user to provide input indicating whether only the first active communication session and the third active communication session are to be merged or whether the first active communication session, the second active communication session, and the third active communication session are to be merged;
receiving, by the communication device from the user, input indicating that the first active communication session and the third active communication session are to be merged;
initiating, by the communication device in response to the receiving of the input, a merging of the first communication session and the third communication session to form a merged active communication session;
displaying, by the communication device on the touch screen display, a graphical object representing the merged active communication session;
detecting, by the communication device, a reverse-pinch touch gesture provided by the user on the touch screen display in relation to the graphical object representing the merged active communication session; and
initiating, by the communication device in response to the reverse-pinch touch gesture, a splitting of the merged active communication session into the first active communication session and the third active communication session.

11. A system comprising:
a communication facility configured to maintain multiple active communication sessions between multiple communication devices; and
a user interface facility communicatively coupled to the communication facility and configured to
display, on a touch screen display, multiple graphical objects representing the multiple active communication sessions, the multiple graphical objects including non-adjacent graphical objects representing two or more of the multiple active communication sessions and one or more other graphical objects representing one or more of the other active communication sessions disposed between the non-adjacent graphical objects,
detect a pinch touch gesture provided by a user on the touch screen display in relation to the non-adjacent graphical objects representing two or more of the multiple active communication sessions,
prompt, in response to the pinch touch gesture, the user to provide input indicating whether only the active communication sessions represented by the non-adjacent graphical objects are to be merged or whether the active communication sessions represented by the non-adjacent graphical objects as well as all of the other active communication sessions represented by the one or more other graphical objects disposed between the non-adjacent graphical objects are to be merged;
receive, from the user, the input indicating which of the multiple active communication sessions are to be merged; and initiate, in response to receipt of the input, a merging of the multiple active communication sessions indicated by the input to form a merged active communication session.

12. The system of claim 11, wherein:

the multiple active communication sessions comprise multiple separate, active voice call sessions between the multiple communication devices; and the merged active communication session comprises a conference call session that bridges two or more of the multiple active, separate voice call sessions together.

* * * * *